United States Patent [19]
Jones

[11] Patent Number: 6,133,205
[45] Date of Patent: Oct. 17, 2000

[54] METHOD OF REDUCING THE CONCENTRATION OF METAL SOAPS OF PARTIALLY ESTERIFIED PHOSPHATES FROM HYDROCARBON FLOWBACK FLUIDS

[75] Inventor: Cruise K. Jones, Houston, Tex.

[73] Assignee: Nalco/Exxon Energy Chemical L.P., Sugar Land, Tex.

[21] Appl. No.: 09/392,171

[22] Filed: Sep. 8, 1999

[51] Int. Cl.$^7$ .................. C09K 3/00; C02F 1/68; C07C 7/00
[52] U.S. Cl. ............ 507/276; 507/277; 210/749; 210/906; 585/854
[58] Field of Search .................. 507/276, 277; 210/749, 906; 585/854; 166/308

[56] References Cited

U.S. PATENT DOCUMENTS

| | | |
|---|---|---|
| 4,104,173 | 8/1978 | Gay et al. . |
| 4,787,994 | 11/1988 | Thorne et al. . |
| 4,895,641 | 1/1990 | Briceno et al. . |
| 5,202,035 | 4/1993 | Huddleston . |
| 5,384,039 | 1/1995 | Padron et al. . |
| 5,514,645 | 5/1996 | McCabe et al. . |
| 5,882,506 | 3/1999 | Ohsol et al. . |
| 5,909,773 | 6/1999 | Koehler et al. . |

FOREIGN PATENT DOCUMENTS 2225297  12/1997  Canada .

*Primary Examiner*—Philip Tucker
*Attorney, Agent, or Firm*—Kelly L. Cummings; Thomas M. Breininger

[57] ABSTRACT

A method is disclosed for reducing the concentration of metal soaps of partially esterified phosphates from a hydrocarbon flowback fluid resulting from a hydraulic fracturing fluid operation using an alkaline aqueous-based additive solution.

6 Claims, No Drawings

METHOD OF REDUCING THE CONCENTRATION OF METAL SOAPS OF PARTIALLY ESTERIFIED PHOSPHATES FROM HYDROCARBON FLOWBACK FLUIDS

FIELD OF THE INVENTION

This invention relates generally to the fouling of refining equipment and, more particularly, to a method of reducing the concentration of metal soaps of partially esterified phosphates from hydrocarbon flowback fluids.

BACKGROUND OF THE INVENTION

For the past several years, many crude oil refiners in North America have experienced greater than anticipated equipment surface fouling of their refining units. Because the increased fouling rate dictates more frequent shutdowns for cleaning, the net business result is a significant increase in the overall cost of operation.

It is believed that a primary source of the fouling is metal soaps of partially esterified phosphate complexes typically present in small, but measurable, amounts (usually 5,000 ppm or less) in the crude oil as a result of being injected into oil wells during hydrocarbon-based hydraulic fracturing operations.

When an oil well is fractured using hydrocarbon fluids, a three-component mixture is simultaneously injected. The mixture contains 1) an organic liquid, such as diesel or kerosene, 2) proppant particles, for example, sand and 3) a reversible viscosifier package for the organic liquid, typically containing a metal soap of a partially esterified phosphate, as well as a rate-controlled viscosity reducer generally referred to as a "breaker."

The mixture is injected into the well at a pressure greater than the natural oil well formation pressure and also high enough to result in the fracturing of the formation.

Fracturing the well produces channels in the rock so that oil flow can be maximized. Use of an organic liquid during fracturing serves to reduce problems associated with water-sensitive formations. The proppant helps to hold the fractured formation open and provides a stable porous medium for greater oil flow. The use of a reversible viscosifier, such as a metal soap of a partially esterified phosphate (MSPEP), serves to thicken the fluid, thereby uniformly suspending the proppant during injection, facilitating proppant placement and finally reducing the liquid's viscosity through a controlled acid-base reaction of the partially esterified phosphate with the breaker. MSPEPs are extremely effective in hydrocarbon-based hydraulic fracturing operations and are generally regarded as the preferred viscosifiers for this application.

The large increase in fouling rate observed over the past few years at refineries is attributed mainly to the increase in the number of oil wells fractured with these types of hydrocarbon-based phosphates. As mentioned, this has become a major concern for North American refiners as it has increased their overall operation costs due to more frequent cleaning of the refining equipment. That is, while the fouling problem resulting from the use of MSPEPs has probably always occurred, the increased severity of the fouling has only recently been seen due to an increase in the number of wells fractured with hydrocarbon-based fracturing fluids containing MSPEPs.

The fouling deposition problem resulting from the use of MSPEPs is particularly severe because the preferred cleaning is a combination of mechanical and chemical methods. The use of such methods is expensive because refinery distillation units must be shut down to carry out the cleaning, thereby leading to lost refining production.

Accordingly, it would be desirable to provide a method of reducing the concentration of MSPEPs from a hydrocarbon flowback fluid resulting from hydrocarbon-based hydraulic fracturing operations. A "hydrocarbon flowback fluid" is generally defined as the hydrocarbon fracturing fluid used in the fracturing operation, initially injected into the oil well during fracturing, and later "flowed back" out of the well as a natural consequence of returning the oil well to production. It would also be desirable to provide a method of reducing MSPEP concentrations which is both practical and economical.

SUMMARY OF THE INVENTION

The method of the invention calls for adding to and mixing with a hydrocarbon flowback fluid resulting from a hydraulic fracturing fluid operation an alkaline aqueous-based additive solution to reduce the concentration of MSPEPs from the hydrocarbon flowback fluid. The inventive method is economically-appealing and effectively reduces the concentration of MSPEPs from the hydrocarbon flowback fluid.

DETAILED DESCRIPTION OF THE INVENTION

The present invention is directed to a method of reducing the concentration of MSPEPs from a hydrocarbon flowback fluid (HFF) resulting from a hydraulic fracturing fluid operation which included MSPEPs. The MSPEPs which may be present in the HFF include compositions based on alkyl phosphate monoesters, alkyl phosphate diesters, alkyl phosphate triesters, alkyl phosphate acid monosalts, alkyl phosphate acid disalts and mixtures thereof. Specific metals which may be used in the fracturing operation to form the MSPEPs include iron ion, aluminum ion or a mixture thereof, and a carboxylic acid or carboxylic acid salt. Additional heteroatom-containing compounds may also be present in forming the MSPEPs.

The HFF may contain from about 0.01 to about 10,000 ppm of elemental phosphorous and from about 0.01 to about 10,000 ppm of elemental nitrogen. The HFF may further contain soluble organic or inorganic acids and soluble organic or inorganic acid salts. Representative MSPEP compositions capable of yielding phosphorous within the above mentioned ranges in the HFF are described in U.S. Pat. Nos. 4,104,173; 4,787,994; 5,202,035 and 5,514,645, among others.

In accordance with this invention, an alkaline aqueous-based additive solution (AAAS) is added to and mixed with the HFF to reduce the concentration of MSPEPs from the HFF. Specifically, the MSPEP compounds are extracted into the aqueous solution, with subsequent precipitation of a significant amount of the MSPEP from the HFF into the aqueous phase or precipitated from both phases. After subsequent chemical or physical separation of the AAAS from the HFF, the HFF is processed in typical refinery operations with a reduced tendency to create deposits on refinery surfaces contacted by the HFF. The AAAS is regenerated at or near the original pH for processing additional HFF's.

The alkaline aqueous-based solutions which may be used in the practice of this invention include hydroxides, such as potassium hydroxide, lithium hydroxide, sodium hydroxide, cesium hydroxide, calcium hydroxide, magnesium hydroxide and mixtures thereof. Potassium hydroxide is the most preferred. The alkaline aqueous-based additive solution may also include one of more surfactants. Suitable surfactants include cationic, anionic or nonionic surfactants and mixtures thereof.

It is preferred that the AAAS be added to the HFF in the range of about 1 part AAAS to about 70 parts HFF. More preferably, the additive solution is added in an amount of from about 1 part AAAS to about 50 parts HFF, with about 1 part AAAS to about 40 parts HFF being most preferred. The additive solution can be introduced into the HFF by any conventional method.

EXAMPLES

The following examples are intended to be illustrative of the present invention and to teach one of ordinary skill how to make and use the invention. These examples are not intended to limit the invention or its protection in any way.

Example 1

4-Step Lab Preparation of a Simulated Phosphorous-Containing HFF
Step One: Preparation of Phosphate Ester A 4-neck reaction flask was used, equipped with a thermometer, mechanical stirrer, condenser and gas ($N_2$) inlet. Triethyl phosphate (TEP) and phosphorous pentoxide ($P_2O_5$) were mixed in a mole ratio of 1.32 moles of TEP to 1.0 moles of $P_2O_5$ and reacted for two hours at 175° F. to produce a polyphosphate intermediate. All additions and reactions throughout the experiment were conducted under a nitrogen blanket.

The reaction was exothermic and complete after two hours at 175° F., after which the temperature was allowed to drop back to 140° F. A mixture of fatty $C_6$ to $C_{10}$ linear alcohols comprising approximately 23 weight percent hexanol, 42 weight percent octanol and 35 weight percent decanol was then added to the polyphosphate intermediate, while holding the temperature between about 140° F. and about 175° F. The fatty alcohol mixture was added dropwise to the polyphosphate intermediate. Three moles of the fatty alcohol mixture were used for each mole of phosphorous pentoxide used in producing the intermediate.

After completing the fatty alcohol addition, the temperature was allowed to increase to between about 250 and 260° F. and held there for two hours to complete the reaction. The reaction product was the phosphate ester in liquid form. An alkyl phosphate diester easily poured from the flask and was diluted to 75 wt % in a xylene/heptane mixture.

It is important to note that the concentration of phosphorous in the hydrocarbon fracturing operation was derived from the introduction of phosphate ester. The hydrocarbon in this example, i.e., kerosene, was analyzed for organophosphorous content prior to the addition of the phosphate ester and found to contain less than 5 ppm phosphorous.
Step Two: Preparation of Iron Solution A 20 wt % ferric sulfate aqueous solution was prepared. This was followed by the addition of 99 wt % triethanolamine to the ferric sulfate solution with subsequent mixing. The weight ratio of the 20 wt % ferric sulfate solution to 99 wt % triethanolamine was 90/10 respectively.
Step Three: Preparation of Fracturing Fluid Composition (FCC)

The FCC prepared in this step was meant to model the fluid which is injected downhole during a typical hydrocarbon-based hydraulic fracturing operation. The fluid which "flows back" out of the well after the fracturing operation is conducted (i.e., termed the "hydrocarbon flowback fluid") is a diluted form of the FCC. The fluid flowing back out of the well is naturally diluted with crude oil, which also flows from the well after the fracturing operation is conducted.

Kerosene and the phosphate ester solution were added together in a stirred vessel followed by the addition of the iron solution. Within about 30 seconds, the fluid was substantially gelled (>100cps). The volume mix ratio was 97.6/0.80/1.6 (vol/vol/vol) kerosene/phosphate ester/iron solution respectively. The batch size was approximately 12 liters.
Step Four: Viscosity Reduction of the Fracturing Fluid Composition (the MSPEP)

HFF Batch One—900 g of the FCC were added to a 2-liter flask equipped with overhead stirrer, blade, heating mantle, condenser and thermometer. 13.48 g of $Ca(OH)_2$ were then added and stirred. The contents were heated, while stirring, to 65° C. for about 45 minutes. The contents were allowed to stand and cool to room temperature to a viscosity of less than 10 cps. The solids were filtered from the liquid phase (Filtrate #1) and then washed separately with about 200 ml heptane, followed by filtering the heptane from the solid and drying to constant weight (accomplished at about 80° C./0.1 mmHg within about 6 hrs). The amount of solids collected was 22.2 g.

HFF Batch Two—900 g of the FCC were added to a 2-liter flask equipped with overhead stirrer, blade, heating mantle, condenser and thermometer. 13.48 g of MgO were then added and stirred. The contents were heated, while stirring, to 65° C. for about 45 minutes. The contents were allowed to stand to cool to room temperature. The solids were filtered from the liquid phase (Filtrate #2) and then washed separately with about 200 ml heptane, followed by filtering the heptane from the solid and drying to constant weight (accomplished at about 80° C./0.1 mmHg within about 6 hours). The amount of solids collected was 11.8 g.

Filtrate #1 and Filtrate #2 were separately analyzed for phosphorous content by inductively coupled plasma (ICP). These represented the control samples. Subsequently, 150 ml samples of Filtrate #1 and #2 were separately added to a plastic jar followed by the addition of 3.75 ml of a 50 wt % aqueous potassium hydroxide solution. Each were stirred for 30 seconds at 4000 rpm on a Silverson homogenizer. The lower layer from each was decanted and the upper layer was sent for ICP comparison with the control samples. The results are shown below in Table 1.

TABLE 1

| Sample # | Filtrate # | Breaker Type /Dosage[b] | AAAS Type, Dosage[c] | Phosphorous in oil, ppm | Wt % Reduction in Phosphorous vs. Control |
|---|---|---|---|---|---|
| 1[a] | None (Control) | None | N/A | 755 | — |
| 2 | 1 | $Ca(OH)_2$, 100 | None | 101 | — |
| 3 | 1 | $Ca(OH)_2$, 100 | 50% KOH, 3.75 mls | 89 | 11.8 |
| 4 | 2 | MgO, 100 | None | 516 | — |

TABLE 1-continued

| Sample # | Filtrate # | Breaker Type /Dosage[b] | AAAS Type, Dosage[c] | Phosphorous in oil, ppm | Wt % Reduction in Phosphorous vs. Control |
|---|---|---|---|---|---|
| 5 | 2 | MgO, 100 | 50% KOH, 3.75 mls | 97 | 81.2 |

[a]Sample 1 represents the phosphate ester solution prepared in Step One above, added to kerosene. No other component was present other than the phosphate ester solution and kerosene.
[b]Dosage in lbs/1000 gallons HFF
[c]Dosage in gallons AAAS/1000 gallons HFF As shown in Table 1, the reduction of phosphorous content by this procedure ranged from 11.8 wt % in calcium hydroxide broken samples to 81.2 wt % reduction in the magnesium oxide broken samples after washing with the AAAS.

Example 2

4-Step Lab Preparation of a Simulated Phosphorous-Containing HFF

Step One: Preparation of Pre-Aluminum Salted Phosphate Ester

A 4-neck reaction flask was used, equipped with a thermometer, mechanical stirrer, condenser and gas ($N_2$) inlet. 200 g of toluene and 136 g of triethyl phosphate were added to the flask, followed by 80.8 g of phosphorous pentoxide under a nitrogen blanket. The reactants were heated to 80° C. for approximately two hours. Thereafter, a blend of 122.8 g of $C_6$ to $C_{10}$ alcohol and 89.1 g of hexanol were added to the flask dropwise over 45 minutes at 60–80° C. The reactants were heated to between about 120–125° C. for approximately two hours. The reaction product was then cooled to about 90° C. 161.5 g of aluminum sulfate hydrate and 228.7 g of toluene were added to the flask and the nitrogen blanket was discontinued. About 73 g of water were collected in azeotrope at 95 to about 115–120° C. Thereafter, the mixture was permitted to cool. A clear solution was produced.

Step Two: Preparation of 17 wt % Potassium Hydroxide (KOH) Aqueous Solution

A 17 wt % aqueous KOH solution was prepared by adding 17.0 g KOH to 83.0 g of distilled water until solution formed. This was done slowly to moderate the exotherm which occurred as a result of mixing KOH with water.

Step Three: Preparation of Fracturing, Fluid Composition (FCC)

The FCC prepared in this step was meant to model the fluid which is injected downhole during a typical hydrocarbon-based hydraulic fracturing operation. The fluid which "flows back" out of the well after the fracturing operation is conducted (i.e., the "hydrocarbon flowback fluid") is a diluted form of the FCC. The fluid flowing back out of the well is naturally diluted with crude oil, which also flows from the well after the fracturing operation is conducted.

Kerosene and the pre-aluminum salted phosphate ester solution were added together in a stirred vessel followed by the addition of the KOH solution. Within about 1 minute, the fluid was substantially gelled (>100 cps). The volume mix ratio was 98.9/0.80/0.32 (vol/vol/vol) kerosene/pre-aluminum salted phosphate ester/KOH solution respectively. The batch size was approximately 12 liters.

Step Four: Viscosity Reduction of the Fracturing Fluid Composition

HFF Batch Three—900 g of the FCC were added to a 2-liter flask equipped with overhead stirrer, blade, heating mantle, condenser and thermometer. 13.48 g of $Ca(OH)_2$ were then added and stirred. The contents were heated, while stirring, to 65° C. for about 45 minutes. The contents were allowed to stand and cool to room temperature to a viscosity of less than 10cps. The solids were filtered from the liquid phase (Filtrate #3) and then washed separately with about 200 ml heptane, followed by filtering the heptane from the solid and drying to constant weight (accomplished at about 80° C./0.1 mmHg within about 6 hrs). The amount of solids collected was 21.7 g.

HFF Batch Four—900 g of the FCC were added to a 2-liter flask equipped with overhead stirrer, blade, heating mantle, condenser and thermometer. 13.48 g of MgO were then added and stirred. The contents were heated, while stirring, to 65° C. for about 45 minutes. The contents were allowed to stand and cool to room temperature. The solids were filtered from the liquid phase (Filtrate #4) and then washed separately with about 200 ml heptane, followed by filtering the heptane from the solid and drying to constant weight (accomplished at about 80° C./0.1 mmHg within about 6 hrs. The amount of solids collected was 15.1 g.

Filtrate #3 and Filtrate #4 were separately analyzed for phosphorous content by inductively coupled plasma (ICP). These represented the control samples. Subsequently, 150 ml samples of Filtrate #3 and #4 were separately added to a plastic jar followed by the addition of 3.75 ml 50 wt % aqueous potassium hydroxide solution. Each were stirred for 30 seconds at 4000 rpm on a Silverson homogenizer. The lower layer from each was decanted and the upper layer sent for ICP comparison with the control samples. The results are shown below in Table 2.

TABLE 2

| Sample # | Filtrate # | Breaker Type /Dosage[b] | AAAS Type, Dosage[c] | Phosphorous in oil, ppm | Wt % Reduction in Phosphorous vs Control |
|---|---|---|---|---|---|
| 1[a] | None (Control) | None | None | 755 | — |
| 6 | Al, 3 | Ca(OH)$_2$, 100 | None | 162 | — |
| 7 | Al, 3 | Ca(OH)$_2$, 100 | 50% KOH, 3.75 ml | 22 | 86.5 |
| 8 | Al, 4 | MgO, 100 | None | 295 | — |

TABLE 2-continued

| Sample # | Filtrate # | Breaker Type /Dosage[b] | AAAS Type, Dosage[c] | Phosphorous in oil, ppm | Wt % Reduction in Phosphorous vs Control |
|---|---|---|---|---|---|
| 9 | Al, 4 | MgO, 100 | 50% KOH, 3.75 ml | 20 | 93.2 |

[a]Sample 1 represents the phosphate ester solution prepared in Step One above, added to kerosene. No other component was present other than the phosphate ester solution and kerosene.
[b]Dosage in lbs/1000 gallons HFF
[c]Dosage in gallons AAAS/1000 gallons HFF As shown in Table 2, the reduction of the phosphorous content by this procedure ranged from 86.5 wt % in calcium hydroxide broken samples to 93.2 wt % reduction in the magnesium oxide broken samples after washing with the AAAS.

In both Example 1 and Example 2, it is shown that contact with hydroxide solutions will reduce the concentration of phosphorous in the hydrocarbon.

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A method of reducing the concentration of metal soaps of partially esterified phosphates from a hydrocarbon flowback fluid resulting from a hydraulic fracturing fluid operation comprising adding to and mixing with the hydrocarbon flowback fluid and effective reducing amount of a hydroxide selected from the group consisting of potassium hydroxide, lithium hydroxide, sodium hydroxide cesium hydroxide, calcium hydroxide magnesium hydroxide and mixtures thereof.

2. The method of claim 1 wherein the hydroxide is potassium hydroxide.

3. The method of claim 1 further comprising the addition of at least one surfactant selected from the group consisting of cationic surfactants, anionic surfactants, nonionic surfactants and mixtures thereof.

4. The method of claim 1 wherein the hydroxide is added to the hydrocarbon flowback fluid in an amount of from about 1 part hydroxide to about 70 parts hydrocarbon flowback fluid.

5. The method of claim 1 wherein the hydroxide is added to the hydrocarbon flowback fluid in an amount of from about 1 part hydroxide to about 50 parts hydrocarbon flowback fluid.

6. The method of claim 1 wherein the hydroxide is added to the hydrocarbon flowback fluid in an amount of from about 1 part hydroxide to about 40 parts hydrocarbon flowback fluid.

* * * * *